United States Patent Office 3,493,661
Patented Feb. 3, 1970

3,493,661
REGULATION OF HEAT AND ESTRUS WITH 1-[p-(β-DIETHYLAMINOETHOXY)PHENYL] - 1,2 - DIPHENYLCHLOROETHYLENE
Dorsey E. Holtkamp, Lebanon, Ohio, assignor to Richardson-Merrell Inc., New York, N.Y., a corporation of Delaware
No Drawing. Filed Nov. 14, 1966, Ser. No. 593,677
Int. Cl. A61k 27/00
U.S. Cl. 424—330     4 Claims

ABSTRACT OF THE DISCLOSURE

A method for synchronizing estrus, including heat, in domestic animals which comprises administering orally or by injection to such animals, an effective quantity of 1-[p-(β-diethylaminoethoxy)phenyl] - 1,2 - diphenylchloroethylene or a non-toxic acid addition salt thereof for at least five days. Animal feeds and concentrates containing the compound are also disclosed.

---

This invention relates to the use of 1-[p-(β-diethylaminoethoxy)phenyl] - 1,2 - diphenylchloroethylene and non-toxic acid addition salts thereof to regulate heat and estrus in domestic female animals. More particularly this invention relates to the synchronization of estrus, including heat, in female animals such as sheep, swine, and cattle of reproductive age and the suppression of heat in feedlot heifers.

The compound 1 - [p-(β-diethylaminoethoxy)phenyl]-1,2-diphenylchloroethylene, together with non-toxic acid addition salts thereof, is described in U.S. Patent No. 2,914,563 which issued on Nov. 24, 1959. This compound or its non-toxic acid addition salts is referred to herein as the active ingredient. The free base form can be represented by the following formula:

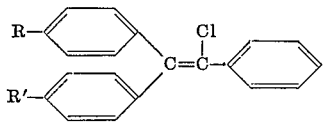

wherein one of R and R' is hydrogen and the other is the group

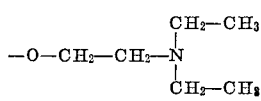

It can be seen that the above formula includes two geometric isomers depending on whether R or R' is hydrogen. The active ingredient can be either one of the two isomers or a mixture thereof.

Synchronization of estrus, including heat, in female animals of reproductive age is desirable for controlled timing of artificial or natural insemination of large numbers of domestic breeding animals. Controlled insemination gives greater uniformity of timing of parturition. In sheep, induction of and synchronization of estrus, including heat, together with prompt insemination makes it possible to obtain more than two lambings in two years. The suppression of heat in feedlot heifers gives an increase in efficiency of food utilization (i.e., feed intake: pounds body weight gain). The suppression of heat reduces muscular energy expended by a herd when one or more heifers is in heat and permits such energy to be stored as protein and fat in the growing animal. The term feedlot heifers refers to heifers which are provided with all or substantially all of their nutritional requirements, usually in an enclosure or within limited quarters, i.e., without the need for the heifers foraging for their food. The term "estrus" as used herein means the physiologic preparation of the reproductive organs of the female for coital and/or reproductive purposes. The term "heat" as used herein means behavioral receptivity of the female to mounting by a male and/or male-like mounting by or of other animals.

Advantages for the use of the active ingredient in this invention include lower estrogenicity than that of steroidal estrogens, such as estradiol and estrone, or of non-steroidal estrogens such as stilbestrol and absence of progestational activity such as that observed with steroids such as medroxyprogesterone acetate. Also, in some animals, an increase in the number of multiple births results by the administration of the active ingredient.

The active ingredient can be adminstered by conventional techniques such as by injection or orally. Oral administration, e.g., in feedstuff, of the active ingredient, particularly the dihydrogen citrate salt form is preferred. While the active ingredient can be orally administered in other ways, it is preferred to first prepare a concentrate by combining it with a feed or feed equipment which is adapted for use in feeding the particular animal and then diluting or mixing the concentrate with other feed material. Also, the active ingredient can be administered as top dressing on feed. By way of illustration, the feed in the concentrate can be a protein supplement or vitamin supplement such as that of soybean meal, cottonseed meal, alfalfa metal, etc.; however, other nutrients can be employed in place of those mentioned above, e.g., soy grits, wheat middlings, any of the cereal meals, ground alfalfa, ground magnesium carbonate, pumice, ground corn cobs, bone meal, ground oyster shells, and the like. The quantity of active ingredient in the feed concentrate can vary over a wide range such as that of about 500 to 2000 milligrams (mg.) thereof per pound of feed. The active ingredient can also be supplied to the animal by dissolving or dispersing it in the drinking water or other liquid constituents of the diet such as skim milk, buttermilk or the like in substantially the same concentrations as in the feed. In formulating injectable preparations, a vegetable oil or aqueous medium with a suspending agent can be employed as the solvent or carrier. The concentration of the active ingredient in such carriers can be from about 0.1 to 10% by weight of the carrier employed.

For the synchronization of estrus, including heat, in sheep, when given orally such as in the feed, the active ingredient is administered in quantities sufficient to provide a daily dose from about 50 mg. to 300 mg. for each ewe for a period of at least about five days or more, depending on size and breed of sheep. Preferably, the daily dose is from about 100 to 200 mg. per ewe for a period of from about 8 to 18 days. Doses below 50 mg. or above 300 mg. per ewe can give erratic results and are therefore not suitable.

For the synchronization of estrus, including heat, in cattle, when given orally, e.g., in the feed, the active ingredient is adminsitered in quantities sufficient to provide a daily dose of from about 30 mg. to 400 mg. per cow per day for a period of at least about five days or more, depending on the size and breed of cow. Doses outside this range give more erratic results and are therefore not suitable. Preferably, the active ingredient is administered in quantities sufficient to provide a daily dosage per cow of from about 50 mg. to 250 mg. for a period of about 5 to 18 days.

For the suppression of heat in heifers, when given orally, e.g., in the feed, the active ingredient is administered in quantities sufficient to provide a daily dose of from about 50 mg. to 500 or more mg. per heifer per day for the desired period of heat suppression depending on the size and breed of heifer, although repeated treatment periods of such as one to seven days, with intervals of about a day is also effective. Doses below this range are not suitable. Preferably, the active ingredient is administered in the feed or heifers sufficient to provide a daily dose per heifer of about 100 to 300 mg. per heifer per day for the desired period of heat suppression.

It can be seen that the method of this invention for the synchronization of estrus, including heat, merely involves administration of the active ingredient for a period of time and the animals are or come into estrus, including heat, within a predictable time after administration of the active ingredient is stopped, e.g., one or two days for sheep. In the case of suppression of estrus in feedlot heifers, the estrus is suppressed during the period of administration of the active ingredient.

The following examples are illustrative of the invention.

EXAMPLE 1

This example shows the synchronization of estrus, including heat, in ewes, i.e., female sheep of reproductive age.

The dihydrogen citrate salt of 1-[p-($\beta$-diethylaminoethoxy)phenyl]-1,2-diphenylchloroethylene as a mixture of its geometric isomers is mixed with soybean meal to prepare an animal feed concentrate containing about 750 milligrams (mg.) of the salt per pound of the medicated feed. This is subsequently diluted with a mixed grain ration to produce a concentration of 150 mg. of the salt per pound of feed. One-half pound of this feed is fed twice daily for a period of 18 days to 60 young reproductively cycling, cross bred ewes. During this period about 50 of the ewes come into heat while receiving the medication and 40 of the ewes are in estrus, including heat, on the 19th and 20th days when they are receptive to breeding.

EXAMPLE 2

This example shows suppression of heat in feedlot heifers.

The active ingredient in the form of its dihydrogen citrate salt is fed to 20 Holstein heifers for a period of 16 days at a level of 150 mg. per day per animal. The active ingredient contains a mixture of isomers. The heifers are stanchioned and fed individually during the 16 day period. The active ingredient is administered by placing it on top of each animal's daily grain ration each morning. Less than 20% of the heifers come into heat during the 16 day period that the active ingredient is administered. At a higher dose, none of the animals of this breed and size come into heat.

EXAMPLE 3

This example shows synchronization of estrus, including heat, in cattle.

The dihydrogen citrate salt of 1-[p-($\beta$-diethylaminoethoxy)phenyl]-1,2-diphenylchloroethylene is fed to 60 female cattle of reproductive age. One-hundred and fifty mg. of this active ingredient containing a mixture of its isomers is administered daily to each cow in alfalfa meal for a period of 16 days. About 40 of the cows are in estrus, including heat, on about the 21st day after the drug treatment is stopped.

What is claimed is:

1. A method for synchronizing estrus, including heat, in female sheep and cattle of reproductive age which comprises administering orally or by injection to such animals for a period of at least five days an amount sufficient to suppress estrus of 1-[p-($\beta$-diethylaminoethoxy)phenyl]-1,2-diphenylchloroethylene or non-toxic acid addition salts thereof and thereafter discontinuing the administration of said compound before the animal is desired to develop estrus.

2. A method for synchronizing estrus, including heat, in female sheep of reproductive age which comprises orally administering to such sheep from about 50 to 300 mg. per each sheep, per day of 1-[p-($\beta$-diethylaminoethoxy)phenyl]-1,2-diphenylchloroethylene or non-toxic acid addition salts thereof for a period of at least about five days and thereafter discontinuing administration of said compound before the development of estrus in said sheep is desired.

3. A method for suppression of heat in heifers of reproductive age which comprises orally administering to said heifer from about 50 to 500 mg. per day of 1-[p-($\beta$ - diethylaminoethoxy)phenyl] - 1,2 - diphenylchloroethylene and non-toxic acid addition salts thereof daily and continuing the administration of said compound as long as it is desired that the animal be free of heat.

4. A method for synchronizing estrus, including heat, in female cattle of reproductive age which comprises orally adminsitering to such cattle from about 30 to 400 mg. per day per animal of 1-[p-($\beta$-diethylaminoethoxy)phenyl]-1,2-diphenylchloroethylene and non-toxic acid addition salts thereof for a period of at least about five days and continuing the administration of said compound for a period of time during which it is desired that the animal be free from estrus.

References Cited

UNITED STATES PATENTS 2,914,563  11/1959  Allen et al. _____ 260—570

OTHER REFERENCES

Journal of Animal Science, Day et al., pp. 909–17, 1959.
Veterinary Bulletin (I), see 369, 1963.
Veterinary Bulletin (II), see 2710, 1964.

FRANK CACCIAPAGLIA, JR., Primary Examiner

HOWARD M. ELLIS, Assistant Examiner